United States Patent

[11] 3,585,364

[72] Inventor Tadikonda N. Rao
Plainfield, N.J.
[21] Appl. No. 843,708
[22] Filed July 22, 1969
[45] Patented June 15, 1971
[73] Assignee Bell Telephone Laboratories, Incorporated
Murray Hill, N.J.

[54] THERMAL POWER GENERATING CIRCUIT
9 Claims, 1 Drawing Fig.

[52] U.S. Cl. ........ 219/501
[51] Int. Cl. ........ H05b 1/02
[50] Field of Search ........ 219/501, 805

[56] References Cited

UNITED STATES PATENTS 3,299,345 1/1967 Werts ........ 219/501UX
3,377,545 4/1968 Tueit ........ 219/499X

*Primary Examiner*—Bernard A. Gilheany
*Assistant Examiner*—F. E. Bell
*Attorneys*—R. J. Guenther and Edwin B. Cave

ABSTRACT: A thermal power generating circuit utilizes diodes and transistors having matched characteristics to convert available direct current power into thermal power which is proportional to the level of an input signal. An insignificant amount of power is taken from the signal source.

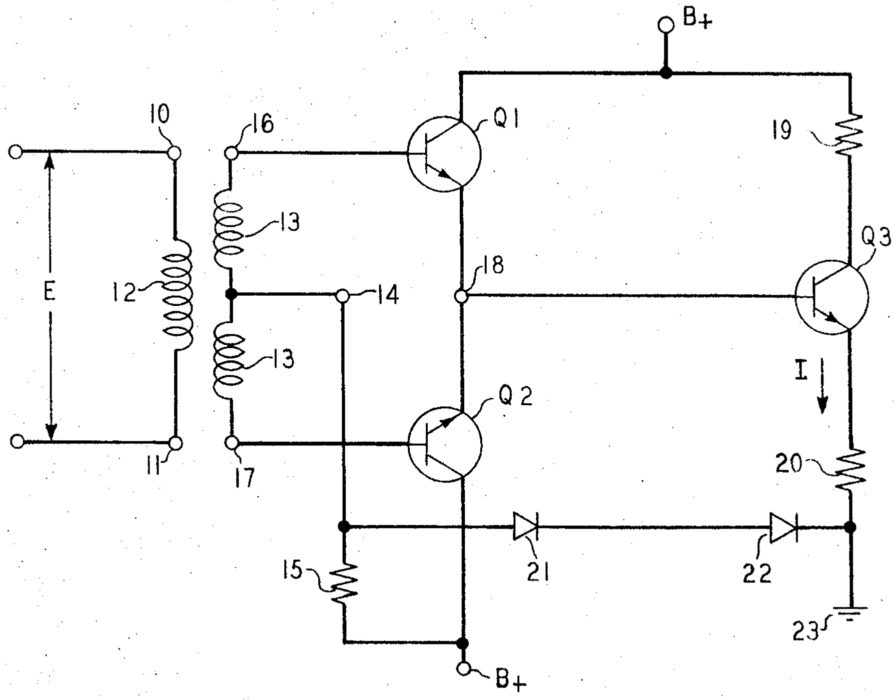
INVENTOR
T.N. RAO
BY
ATTORNEY

THERMAL POWER GENERATING CIRCUIT

BACKGROUND OF THE INVENTION

1. Field of the Invention

This invention relates to power detector circuits and more particularly to circuits for generating thermal power proportional to an input signal.

2. Description of the Prior Art

One method of measuring the mean power of an electrical signal is to convert the signal into thermal power which is proportional to the means power of the signal. The thermal power is then coupled to a circuit which is responsive thereto. Consequently, either the RMS value of voltage or current of the input signal or the absolute value of the input signal could be easily obtained. A circuit for making such measurements is disclosed in a patent application by T. N. Rao, Ser. No. 826,408, dated May 21, 1969.

Under some conditions it is desirable to take only an insignificant amount of power from the signal source. Additionally, the amount of direct current DC power available to the circuit may be limited. The use of a resistor, as shown in the application previously referenced, to convert the signal power to thermal power is not acceptable under such conditions. Thus, a need exists for a high efficiency thermal power generating circuit which will convert available DC power to thermal power which is proportional to either the RMS level or the absolute level or value of the input signal.

Accordingly, it is an object of this invention to enhance the ability of a circuit to convert DC power to thermal power which is proportional to the level of an input signal without utilizing a significant amount of the power of the input signal.

SUMMARY OF THE INVENTION

The foregoing object and others are achieved in accordance with the principles of the invention by a thermal power generating circuit which utilizes diodes and transistors having matched characteristics to convert available DC power into thermal power. The input signal is full wave rectified by a transformer-transistor arrangement. The rectified voltage is applied to the base of an output transistor which is connected between a DC source and a reference potential. All transistors are biased to the threshold of conduction by diodes having characteristics matched with the characteristics of the transistors. Thus, the current through the output transistor and its associated resistors is proportional to the level of the input signal. Consequently, the thermal power generated in the transistor and its associated resistors is also proportional to the level of the input signal. The power required from the signal source is very small because of the amplification of the transistors. Virtually all the available DC power is converted into usable thermal power.

BRIEF DESCRIPTION OF THE DRAWING

The invention may be more fully comprehended from the following detailed description and accompanying drawing in which the single FIGURE is a schematic diagram of a preferred embodiment of the invention.

DETAILED DESCRIPTION

As shown in the drawing, the input signal E is connected to terminals 10 and 11 of the primary winding 12 of a transformer. The secondary winding 13 is center tapped and the center tap 14 is connected to a voltage source B+ through a resistor 15. The other terminals 16 and 17 of the secondary winding 13 are connected to the base terminals of transistors Q1 and Q2, respectively. The collector terminals of both transistors Q1 and Q2 are connected to the voltage source B+, and the emitter terminals of the transistors are connected to a common terminal 18. Terminal 18 is connected to the base terminal of an output transistor Q3. The collector terminal of transistor Q3 is connected to the B+ source through resistor 19 and the emitter terminal is connected to a reference potential 23, usually ground, through a resistor 20. Transistors Q1, Q2 and Q3 are biased by a network comprising the resistor 15 and diodes 21 and 22 connected between the B+ source and the reference potential 23.

Transistors Q1 and Q2 have matched characteristics. The characteristics of diode 21 match the characteristics of the base-emitter junctions of transistors Q1 and Q2. Likewise the characteristics of diode 22 match the characteristic of the base-emitter junction of transistor Q3. All these transistors, Q1, Q2, and Q3, and consequently both diodes 21 and 22 might advantageously have matched characteristics. Matching of the characteristics may be easily obtained by forming the transistors and diodes on a single integrated circuit chip.

DESCRIPTION OF OPERATION

Since the characteristics of diode 21 match the base-emitter junction characteristics of transistors Q1 and Q2 and the characteristics of diode 22 match the base-emitter junction characteristics of transistor Q3, transistors Q1, Q2, and Q3 are biased to the threshold of conduction by the circuit arrangement shown in the drawing. Thus an input of any level to the base terminals of transistors Q1 and Q2 will cause these transistors to conduct, consequently causing transistor Q3 to conduct.

When the input signal E is connected to terminals 10 and 11 of the primary winding 12, a signal is produced in the secondary winding 13 of the transformer. The center tapped secondary winding and transistors Q1 and Q2 perform a full wave rectification of the signal. For example, when terminal 16 is positive with respect to the center tap 14, transistor Q1 is conducting and transistor Q2 is nonconducting. Likewise, when terminal 16 is negative, with respect to the center tap 14, transistor Q1 is nonconducting and transistor Q2 is conducting. Thus, when any signal is connected to terminals 10 and 11, a full wave rectified signal will appear at the base terminal of Q3.

The signal appearing at the base of transistor Q3 causes the transistor to conduct producing current I in the emitter terminal which is proportional to the input signal E. An almost identical current will likewise appear in the collector circuit of transistor Q3. The power dissipated or converted to thermal power in resistors 19 and 20 is proportional to the RMS value of the current I and is thus proportional to the RMS value of the input signal E. The total electrical power converted to thermal power in resistors 19 and 20 and in transistor Q3 is proportional to the absolute value of the input signal E. Thus the thermal power generated in resistors 19 and 20 may be utilized if an output proportional to the RMS value of the input signal E is desired. Alternatively, if an output proportional to the absolute value of the input signal is desired, all of the thermal power generated in resistors 19 and 20 and transistor Q3 is usable. In either application, the thermal power may be coupled to a thermal power detector circuit such as that shown in the patent application previously cited.

The only unusable power generated in the circuit is that generated in transistors Q1 or Q2, the DC losses in the transformer, and the losses in the bias network comprising resistor 15 and diodes 21 and 22. However, this unusable power is extremely small. The current in the base terminal of transistor Q3 and likewise in the emitter terminals of either transistors Q1 or Q2 is $I/\beta$. Thus, the current through the transformer secondary 13 is then approximately $I/\beta^2$. Both of these currents are extremely small and thus the losses in the transformer and the transistors Q1 or Q2 are negligible. Likewise the losses in the bias network are negligible when sufficiently high values are chosen for resistor 15 as negligible current will then flow through the bias network.

The thermal power generating circuit is especially applicable where the DC power available from source B+ is quite limited, because the circuit converts virtually all of the available DC power into usable thermal power proportional to the input signal. An insignificant amount of power from the signal source is required by the circuit.

Various modifications to the circuit could be made. For example, the transformer might be replaced by a transistor phase splitter circuit. Such a substitution might require some increase in the available DC power. Therefore, it is to be understood that the embodiment shown is merely illustrative of the principles of the invention. Various modifications thereto might be made by those skilled in the art without departing from the spirit and scope of the invention.

I claim:

1. Circuit means for generating thermal power proportional to an input signal comprising, in combination, an input circuit including first and second transistors for rectifying said signal, an output circuit including a third transistor for converting electrical power to thermal power, and means for biasing each of said transistors to the threshold of conduction whereby an insignificant amount of power from said input signal controls the thermal power generated in said output circuit.

2. Apparatus in accordance with claim 1 wherein said output circuit includes first and second resistors respectively connecting the collector and emitter terminals of said third transistor to a potential source and a reference source, respectively, and said bias means includes first and second diodes connected between said potential source and said reference source.

3. Apparatus in accordance with claim 2 further including a resistor for controlling the current through said first and second diodes and wherein said first diode has characteristics matched with the characteristics of the base-emitter junctions of said first and second transistors, and said second diode has characteristics matched with the characteristics of the base-emitter junction of said third transistor.

4. Circuit means for generating thermal power proportional to an input signal comprising, in combination an input circuit for rectifying said input signal, said input circuit including first and second transistors having emitter terminals connected to a common output terminal and means for connecting said input signal to the base terminals of said first and second transistors, an output circuit connected to said input circuit for converting electrical power to thermal power, said output circuit comprising a third transistor, first means for connecting the collector electrode of said third transistor to a potential source, and second means for connecting the emitter electrode of said third transistor to a reference potential, and means for biasing said input and said output circuits such that the thermal power generated in said output circuit is proportional to the level of said input signal.

5. Apparatus in accordance with claim 4 wherein said first means and said second means are resistors.

6. Apparatus in accordance with claim 4 wherein said bias means comprises first and second diodes.

7. Apparatus in accordance with claim 6 wherein the characteristics of said first diode are matched with the characteristics of the base-emitter junction of said first and second transistors, and the characteristics of said second diode are matched with the characteristics of the base-emitter junction of said third transistor whereby each of said transistors is biased to the threshold of conduction.

8. Apparatus in accordance with claim 6 including resistive means for controlling the current through said first and second diodes.

9. Apparatus in accordance with claim 4 wherein said means for connecting said input signal to the base terminals of said first and second transistors comprises a transformer.